(No Model.) 2 Sheets—Sheet 2.
L. LAWTON, F. SWANN & W. R. WHITEHEAD.
MUFFLE FOR GLASS AND EARTHEN WARE.
No. 405,571. Patented June 18, 1889.
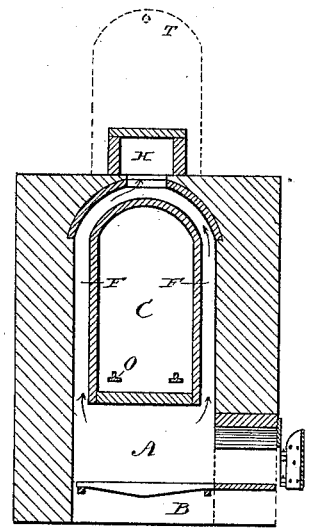
Fig. 3. on 1-2. Fig. 2.
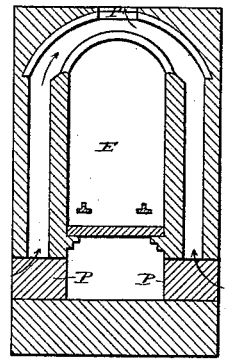
Fig. 4. on 3-4. Fig. 2.
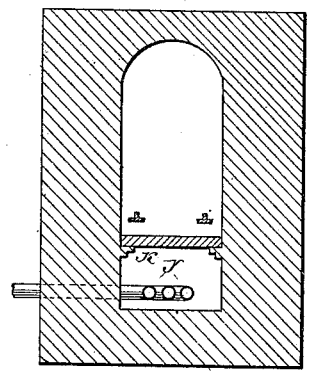
Fig. 6. on 9-10. Fig. 2.
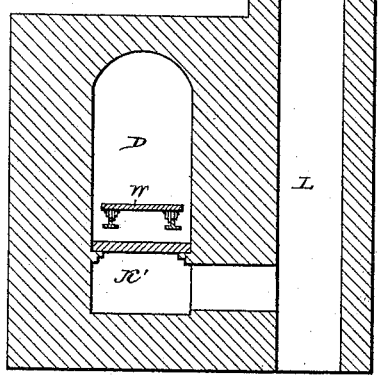
Fig. 5. on 5-6, Fig. 2.
WITNESSES:
INVENTORS:
Lewis Lawton.
Frederick Swann.
William R. Whitehead.
BY
J. C. Lowthorp, jr
ATTORNEY

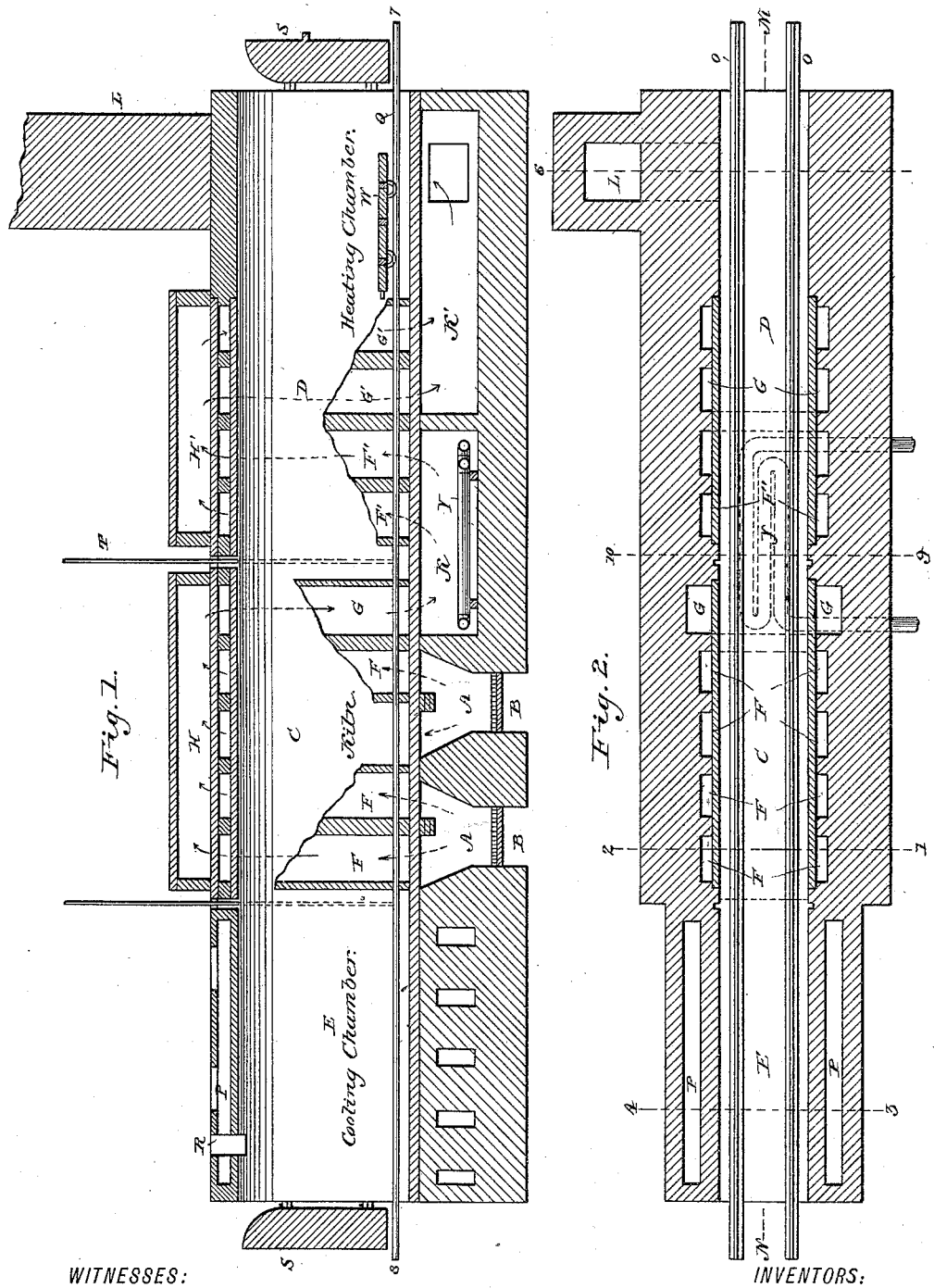

UNITED STATES PATENT OFFICE.

LEWIS LAWTON, FREDRICK SWANN, AND WILLIAM R. WHITEHEAD, OF CHAMBERSBURG, NEW JERSEY; SAID LAWTON ASSIGNOR TO SAID SWANN AND WHITEHEAD.

MUFFLE FOR GLASS AND EARTHEN WARE.

SPECIFICATION forming part of Letters Patent No. 405,571, dated June 18, 1889.

Application filed February 9, 1888. Serial No. 263,549. (No model.)

*To all whom it may concern:*

Be it known that we, LEWIS LAWTON, FREDRICK SWANN, and WILLIAM R. WHITEHEAD, all of Chambersburg, in the county of Mercer and State of New Jersey, have invented certain new and useful Improvements in Pottery-Kilns, of which the following is a specification.

Our invention relates to continuous muffles for burning pottery, glassware, &c.; and the objects of our invention are to economize fuel and regulate and locate the heat, and also to provide facilities for heating the muffle by the use of gas generated from petroleum, naphtha, &c.

Our improved muffle is so constructed as to produce different degrees of heat in various parts thereof, and as the ware is passed through it it is gradually heated to the desired degree and afterward slowly cooled.

We will now proceed to describe our invention with reference to the accompanying drawings, in which—

Figure 1 shows a longitudinal vertical section of the muffle on the line M N on Fig. 2, with a portion of the inner lining removed to show more clearly the arrangement of flues, and also showing in perspective sufficient of the inner construction of the muffle to insure clearness. Fig. 2 is a view of the muffle in plan taken on the line 7 8 of Fig. 1. Fig. 3 represents a transverse vertical section taken on the line 1 2 of Fig. 2. Fig. 4 represents a transverse vertical section of the cooling-chamber, taken on the line 3 4 of Fig. 2. Fig. 5 represents a transverse vertical section of the entrance to the heating-chamber, taken on the line 5 6 of Fig. 2; and Fig. 6 shows a transverse vertical section taken on the line 9 10 of Fig. 2, showing the gas-generating retort in combination with the flue K.

In the drawings, A A are the fire-boxes; B B, the ash-pits; C, the central chamber or kiln proper; D, the heating-chamber; E, the cooling-chamber; F F F F, the direct flues surrounding the central chamber; F' F', the updraft-flues surrounding the heating-chamber; G, downdraft-flue surrounding a portion of the central chamber; G' G', downdraft-flues surrounding a portion of the heating-chamber; H, connecting-flue over the central chamber; H', connecting-flue over heating-chamber; K, lower connecting-flue to heating-chamber; K', connecting-flue to chimney; L, the chimney; O, the track or rails on which are moved the carriages bearing the wares; P, a cold-air flue surrounding the cooling-chamber; R, a vent connecting with the cooling-chamber E; S S, doors closing the ends of the muffle; T T, valves dividing the chambers; W, one of the carriages on which the wares are placed while being burned; and Y, a retort for the generation of gas from petroleum, naphtha, &c.

The operation of the muffle is as follows: Fires are built in the fire-boxes A A. The heat from the fires passes up through the flues F F F F into the flue H, and then descends through the flue G into the flue K, and then up the flues F' F' to the flue H', and through that flue down through the flues G' G' to the flue K', and thence out through the chimney L. The heat is thus greatly economized, and is most intense in the flues surrounding the central chamber C, and it also heats to a less degree the chamber D. The heat entering the cooling-chamber E from the heating-chamber C causes an updraft of cool air through the flues P P, the cool air being drawn in through the outer openings (shown in section in Fig. 1) and passing out through the top, as shown in Fig. 4. The wares to be burned are placed upon racks on the carriage W, and are passed into the chamber D through the opening at its outer end, and the outer door is closed. When the wares are sufficiently heated, they are passed on by rolling the carriage into the central chamber C, where they remain until sufficiently heated. They are then passed on into the cooling-chamber E, where they are cooled sufficiently to prevent injury upon exposure to the air, and then they are passed through the outer opening of the chamber E and removed from the carriage. A series of carriages is used, so that the operation of heating, burning, and cooling the wares is carried on continuously as long as may be desired.

As soon as the carriages are shifted, the valves T T may be slid down, if desired, and raised again when the next shift is to made; but their use is not essential, though beneficial.

If the muffle is to be operated with the use of fuel gas for heating and burning the wares, connection is made outside of the walls of the muffle at one end of the retort Y with a pipe leading to a receiver or tank containing the oil or other fluid from which the gas is to be generated. The other end of the retort is connected outside of the walls of the muffle with a pipe or conductor leading to the fire-boxes A A. Near or opposite the doors of the fire-boxes the pipe is branched, so as to admit of the gas being introduced into both boxes from the outside of the muffle

Having thus described our invention, what we claim as new, and desire to secure by Letters Patent, is—

1. A muffle provided with external hot-air and cold-air flues encompassing different portions of said muffle, whereby different degrees of heat may be maintained in said portions, substantially as described.

2. A muffle externally heated and provided with cold-air flues encompassing a portion of it, said flues communicating at opposite ends with the external air, substantially as described.

3. A continuous muffle provided at one end with external cold-air flues and at the portion adjacent to said end with external heat-flues, substantially as described.

4. A continuous muffle provided at one end with cold-air flues and at the portion adjacent to said end with heat-flues, said heat-flues extending to the opposite end of the muffle, substantially as described.

5. A continuous muffle provided at one end with cold-air flues and at the portion adjacent to said end with heat-flues extending as up and down draft flues to the opposite end of the muffle and encompassing the muffle, substantially as described.

6. A muffle provided with external hot-air and cold-air flues encompassing different portions of said muffle, and a removable partition between the cooling and heating portions of the muffle, substantially as described.

LEWIS LAWTON.
FREDRICK SWANN.
WILLIAM R. WHITEHEAD.

Witnesses:
MILTON R. EASTLACK,
CHAS. D. WATERS.